United States Patent [19]

Bezos et al.

[11] Patent Number: 4,780,653
[45] Date of Patent: Oct. 25, 1988

[54] ANTI-STALL MOTOR DRIVE

[75] Inventors: Angel P. Bezos; Gary A. Tubergen, both of Montgomery County, Md.

[73] Assignee: Pulse Electronics, Inc., Rockville, Md.

[21] Appl. No.: 22,243

[22] Filed: Mar. 5, 1987

[51] Int. Cl.$^4$ ............................................. H02P 1/04
[52] U.S. Cl. ..................................... 318/327; 361/23
[58] Field of Search ................................ 318/326–327, 318/311, 282, 490; 361/33, 92, 88–91, 20–28, 30–31

[56] References Cited

U.S. PATENT DOCUMENTS

| | | | |
|---|---|---|---|
| 3,931,533 | 1/1976 | Stich et al. | 318/254 |
| 3,931,557 | 1/1976 | Osburn | 361/23 |
| 3,942,114 | 3/1976 | Keeling | 318/317 |
| 3,947,738 | 3/1976 | Oliver | 318/345 |
| 4,079,301 | 3/1978 | Johnson, III | 318/326 |
| 4,205,361 | 5/1980 | Shimp | 361/92 |
| 4,246,526 | 1/1981 | Phillips | 318/286 |
| 4,302,711 | 11/1981 | Morser et al. | 318/327 |
| 4,325,095 | 4/1982 | Hart | 361/23 |
| 4,532,567 | 7/1985 | Kade | 361/31 |
| 4,575,662 | 3/1986 | Lehnhoff | 318/282 |
| 4,611,154 | 9/1986 | Lambropoulos et al. | 318/490 |
| 4,692,674 | 9/1987 | Packard et al. | 318/254 |

Primary Examiner—William M. Shoop, Jr.
Assistant Examiner—David Martin
Attorney, Agent, or Firm—C. Lamont Whitham; Michael E. Whitham

[57] ABSTRACT

An anti-stall motor drive circuit for a very slow running permanent magnet d.c. motor is disclosed. The slow running speed of the motor sometimes allows an insulating film to build up between the brushes and the commutator which causes the stalled condition. The motor (10) is connected in the collector circuit of a drive transistor (Q1) which has a current limiting resistor (R9) connected in its emitter circuit. A stalled condition of the motor (10) is sensed by a lack of output from a tachometer (16) output. The output of the tachometer is full wave rectified by an operational amplifier (22) and diodes (CR1 and CR2). The rectified tachometer voltage is applied to an integrator (24 and C1) having a clamping diode (CR7) connected in its feedback circuit. A zero output from the rectifier allows the integrator output to ramp up to a limiting value determined by the clamping diode. The output of the integrator is applied to the base of the drive transistor to cause a voltage approximately fifteen times that of normal operating voltage to be impressed across the motor. This "jolt", which is twice the rated voltage of the motor, overcomes the stalled condition and burns off any insulating film which may have developed between the commutator and the brushes.

4 Claims, 1 Drawing Sheet

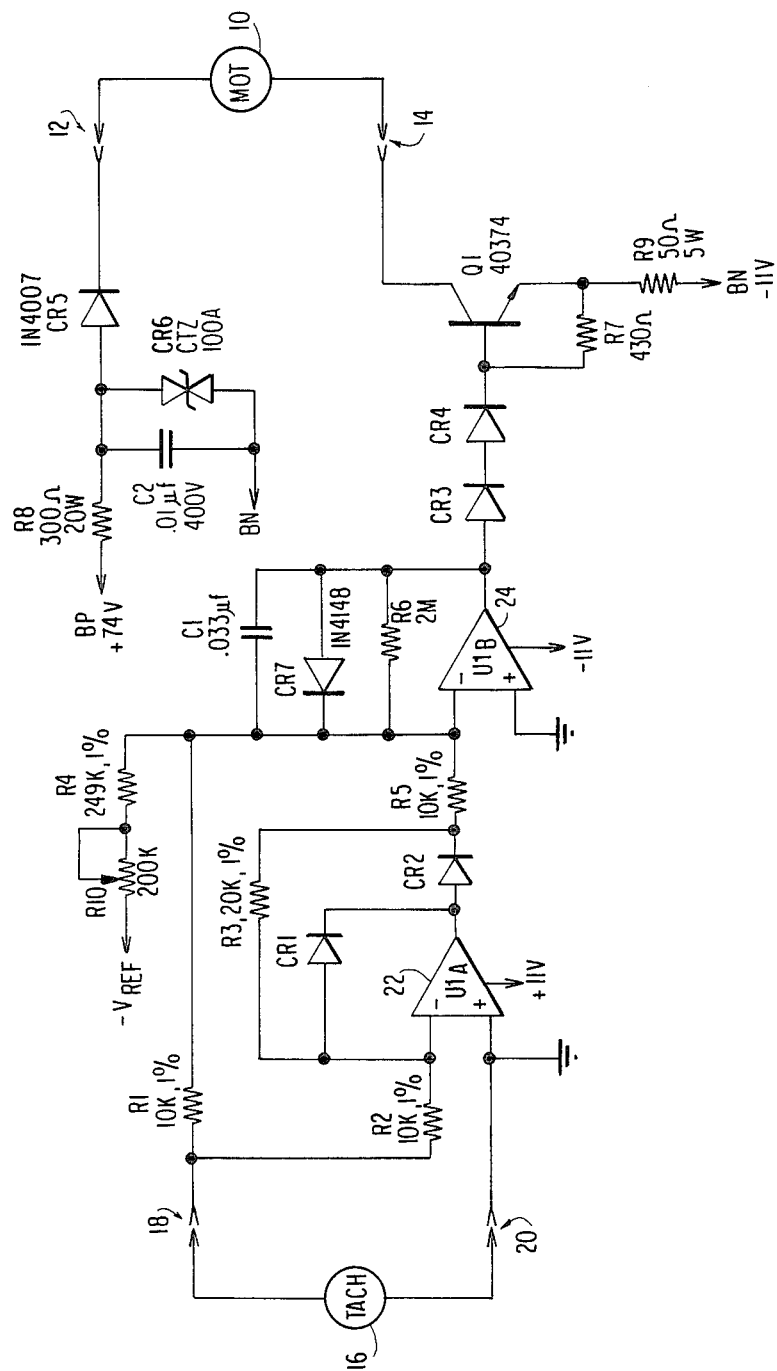

ANTI-STALL MOTOR DRIVE

BACKGROUND OF THE INVENTION

1. Field of the Invention

The present invention is generally related to improvements in electric motor drive circuits and, more particularly, to an anti-stall drive circuit for a permanent magnet d.c. motor which is operated at very slow speed. The invention has particular application in railway data recorders of the type that use a closed-loop magnetic tape data pack.

2. Description of the Prior Art

Railway recorders are installed on locomotives to record various parameters of operation including speed, elapsed time, brake application and the like. These recorders are analogous to flight recorders on commercial aircraft and allow for analysis of the events which occured prior to an accident. In addition, the recorders may be used to verify rules compliance by monitoring daily operations over a specific district or on a system wide basis.

Early railway recorders used chart paper and included one or more pen styli to make the recording on the chart paper. These early recorders have now been generally replaced by magnetic tape recorders which use closed-loop magnetic tape data packs. The data packs, which are similar to the familiar audio eight-track tape cartridges, eliminate the need for frequent reloads and the risk of running out of paper. And because of their cartridge-type packaging, the data packs can be easily removed and replaced by unskilled railway personnel. The recorded data may be "readout" and plotted on chart paper specially designed for the purpose by means of a portable playback unit simply by removing the data pack from the recorder and inserting it into the playback unit.

Railway recorders and playback units of the type described are manufactured and sold by Pulse Electronics, Inc., of Rockville, Maryland. A specific example of such equipment is the 48H Series Locomotive Recording System. The recorder in this system uses a permanent magnet d.c. motor to drive the capstan and is characterized by a very slow capstan speed. The slow capstan speed, and hence tape speed, is justified by the fact that events are being recorded, and therefore a wide frequency bandwidth is not required, and it is desirable to maximize the elapsed time that can be recorded on the tape loop of the data pack. The slow speed of the capstan is accomplished in part by a reduction gear train, but this alone was found not to produce a slow enough tape speed. Therefore, the motor drive circuit was specially designed with tachometer feedback to produce the desired slow tape speed.

The problem with a very slow operation of a permanent magnet d.c. motor is that the motor appears to develop a high impedance contamination between the commutator and the brushes. At higher speeds, such contamination does not develop presumably because the rotor turns fast enough to either prevent the contamination from developing or to clean the contamination off the commutator as it forms. Unfortunately, no such self-cleaning action occurs on the commutator of a permanent magnet d.c. motor operated at very slow speeds in the locomotive recording system. As a result, there is occassionally experienced a stoppage of the motor due to a lack of electrical conduction between the commutator and the brushes. This is easily remedied by spinning the rotor of the motor, but in the meantime valuable data may have been lost.

What was needed was a way in which the stopped condition of the motor could be automatically detected and the motor restarted so that there would be no loss or only a minimal loss of data. The problem appears to be unique to the very slow speed operation of permanent magnet d.c. motors, and no solution was known in the prior art. Moreover, a.c. motor control circuits of the type which sense motor torque to develop a control signal such as shown in U.S. Pat. No. 3,519,910 to Pfaff et al. are not directly applicable to this particular problem. Other tape speed control circuits using a.c. motors such as shown in U.S. Pat. No. 3,634,744 to Toensing et al. and U.S. Pat. No. 3,800,200 to Bunting fail to suggest any remedy to the problem.

SUMMARY OF THE INVENTION

It is therefore an object of this invention to provide an improved motor control circuit which prevents stalling of permanent magnet d.c. motors which are operated at very low speeds.

It is another object of the invention to provide an anti-stall motor drive circuit for permanent magnet d.c. motors which adds little to the expense of manufacture of the drive circuit.

It is a further object of this invention to provide a simple modification to an existing motor drive circuit for railroad locomotive data recorders which allows for retrofit of existing data recorders.

According to the invention, a stalled condition of the motor is sensed by a lack of output from the tachometer feedback. This condition allows an operational amplifier with capacitive feedback to provide an output which ramps up to a limiting level. The operational amplifier output supplies an increasing drive voltage to the base of the motor drive transistor to cause a voltage approximately fifteen times that of normal operating voltage to be impressed across the motor. This "jolt", which is twice the rated voltage of the motor, overcomes the stalled condition and burns off any high impedance contamination which may have developed between the commutator and the brushes.

BRIEF DESCRIPTION OF THE DRAWING

The foregoing and other objects, aspects and advantages of the invention will be better understood from the following detailed description of the invention with reference to the drawing in which the sole figure is a schematic diagram of the improved motor drive circuit according to the preferred embodiment of the invention.

DETAILED DESCRIPTION OF THE PREFERRED EMBODIMENT OF THE INVENTION

Referring now to the drawing, the permanent magent d.c. motor 10 is connected in the collector circuit of an NPN transistor Q1. More specifically, motor 10 is connected between a pair of terminals 12 and 14. Terminal 12 is connected via a current limiting resistor R8 and a diode CR5 to the +74 volt battery positive (BP) from the locomotive cab electrical locker. The +74 volt battery voltage is smoothed and regulated by a capacitor C2 and a Zener diode CR6 connected in parallel with the locomotive battery supply. Terminal 14 is directly connected to the collector of transistor Q1. The emitter of transistor Q1 is connected through resistor R9 to provide a return to battery negative (BN) which is −11 volts, and a biasing resistor R7 is connected between the emitter and the base of transistor Q1.

Transistor Q1 provides the basic drive for the motor 10 by controlling the current flowing through the motor. In the prior recorder circuit, the motor was connected in the emitter circuit of transistor Q1. Moving the motor to the collector circuit of transistor Q1 and adding the emitter resistor R9 is one of the modifications made to the earlier circuit by this invention.

The base drive for transistor Q1 is developed by the output of a tachometer 16 which is driven by the motor 10. Tachometer 16 is connected to a pair of terminals 18 and 20 and provides a sinusoidal voltage output. Resistors R1 and R4 are precision resistors which, in combination with potentiometer R70, allow for precise calibration of the voltage applied across the tachometer 16. Terminal 18 is also connected to the inverting or negative input terminal of operational amplifier 2 via a precision input resistor R2, while terminal 20 is connected in common with the noninverting or positive input terminal of operational amplifier 22 to circuit ground.

Amplifier 22 is connected as a full wave rectifier to provide a recitified, positive d.c. voltage output which is proportional to the speed of the tachometer 16 and, hence, the speed of motor 10. A diode CR1 is connected between the inverting input of operational amplifier 22 and its output and poled to allow the passage of current only from the inverting input to the output of the amplifier. Thus, diode CR1 serves to bypass the amplifier during positive half cycles of the tachometer sinusoidal output voltage. A second diode CR2 is connected in series with the output of amplifier 22 and polled to have its anode connected directly to the amplifier output. Thus, on negative half cycles of the tachometer output voltage, an inverted or positive voltage at the output of amplifier 22 produces a current which is passed by diode CR2. A feedback resistor R3 is connected between the cathode of diode CR2 and the inverting input of amplifier 22. The ratio of the resistances of input resistor R2 and feedback resistor R3 determines the gain of the amplifier 22.

The full wave rectified output from operational amplifier 22 is supplied to an integrator. More particularly, the cathode of diode CR2 is connected to input resistor R5 of a second operational amplifier 24. Input resistor R5 is connected to the inverting input of amplifier 24. The noninverting input of amplifier 24 is connected directly to circuit ground. The negative reference voltage is supplied via potentiometer R70 and precision resistor R4 to the inverting input of amplifier 24. Amplifier 24 has a feedback circuit comprising a resistor R6, a capacitor C1 and a diode CR7 each connected between the output of the amplifier and its inverting input. Diode CR7 is poled to allow the flow of current from the output of the amplifier to its inverting input once the threshold voltage across the diode is exceeded. Thus, diode CR7 serves as a clamp in the integrator feedback. The addition of diode CR7 is another modification to the original circuit made by this invention. The output of amplifier 24 is connected via two series diodes CR3 and CR4 to the base of transistor Q1 to supply the base drive current to the transistor.

Briefly summarizing, the tachometer voltage is input to amplifier 24 through resistor R1. On positive half cycles of the tachometer voltage, amplifier 22 is inactive, clamped by diode CR1. On negative half cycles, the tachometer voltage is amplified in amplifier 22 by two and summed, in integrator amplifier 24, with the current from resistor R1. Therefore, on positive half cycles $I_{IN}=V_{TACH}/R1$ and on negative half cycles $I_{IN}=(-V_{TACH}/R1)+(2V_{TACH}/R5)=V_{TACH}/R1$, where R1=R5.

During normal operation, the rectified tachometer output from operational amplifier 22 is summed with the negative reference voltage which is calibrated for the correct speed of the motor 10. At steady state, a positive output voltage from operational amplifier 24 is applied to the base of NPN transistor Q1 to provide the required drive current to motor 10. The rectified tachometer output voltage from amplifier 22 just balances the negative reference voltage and the negative feedback voltage from feedback capacitor C1. Should the motor 10 speed up producing a more positive output from amplifier 22, the inverted output of amplifier 24 would become more negative reducing the drive current to the motor. On the other hand, should the motor 10 slow down producing a more negative output from amplifier 22, the output of amplifier 24 becomes more positive causing the drive current to motor 10 to increase bringing its speed up to design speed.

According to the invention, in the event that motor 10 stalls due, for example, to a high impedance contamination buildup between the commutator and brushes, the full wave rectified output voltage from amplifier 22 goes to zero. As a result, the negative reference voltage becomes the only input to integrating amplifier 24. This produces a positive ramping voltage at the output of amplifier 24 which is limited by the clamping action of diode CR7. The drive voltage on the base of NPN transistor Q1 becomes quite high driving the transistor to a full on or conducting condition. The effective short circuit causes almost the full +74 volt line voltage to be impressed across motor 10. This is approximately fifteen times the normal operating voltage and is twice the rated voltage of the motor. The emitter resistance R9 limits the motor current to approximately 200 mA. This "jolt" of voltage is effective to restart the motor and burn off any high impedance contamination that may have developed on the commutator. Once restarted, the feedback speed control provided by the rectified tachometer output voltage takes over, quickly reducing the voltage across the motor 10 and reducing the drive current through transistor Q1 to steady state.

From the foregoing, it will be appreciated that the invention accomplishes its objectives by providing an inexpensive solution to a unique problem. That problem manifested itself in the specific application of very slow running permanent magnet d.c. motors to the capstan drive of railroad locomotive data recorders. Because of the quick response time of the modified drive circuit, the condition of a stalled motor is quickly detected and the motor restarted with little or no loss of data. The solution according to the invention, however, is not limited to data recorders of the type described. Rather, the invention may find other applications where very slow running permanent magnet d.c. motors are used such as in various instrumentation and control systems. Therefore, those skilled in the art will understand that while the invention has been described in terms of a specific, preferred embodiment, the invention may be practiced in other and different environments and with modification within the spirit and scope of the appended claims.

Having thus described my invention, what we claim as new and desire to secure by Letters Patent is as follows:

1. An anti-stall motor drive circuit for a very slow running permanent magnet d.c. motor comprising:
    a drive transistor having collector, base and emitter electrodes, said motor being connected to the collector of said drive transistor and a current limiting resistor being connected to the emitter of said drive transistor;
    means for detecting a stalled condition of said motor; and
    means responsive to said detecting means for momentarily increasing a base drive voltage to said transistor to momentarily increase the voltage across said motor an order of magnitude greater than normal opertating voltage and exceeding a rated voltage of the motor to overcome the stalled condition.

2. The anti-stall motor drive circuit recited in claim 1 wherein said detecting means comprises:
    a tachometer driven by said motor, said tachometer generating a sinusoidal output voltage; and
    rectifying means connected to receive the sinusoidal output voltage of said tachometer and providing a rectified output voltage proportional to the speed of said motor, said rectified output voltage going to zero when there is a stalled condition of said motor.

3. The anti-stall motor drive circuit, recited in claim 2 wherein said means responsive to said detecting means comprises:
    an integrator including an operational amplifier having an inverting input and an output, a feedback capacitor connected between said inverting input and said output, and a summing junction connected to said inverting input;
    a first input resistor connecting the output of said rectifying means to said summing junction;
    a second input resistor connecting said tachometer to said summing junction;
    a clamping diode connected between said inverting input and said output of said operational amplifier to limit the output voltage of said integrator; and
    means for connecting the output of said integrator to the base of said transistor.

4. The anti-stall motor drive circuit recited in claim 3 wherein said rectifier means comprises:
    a second operational amplifier having an inverting input and an output, said inverting input being connected to a second summing junction;
    a first diode connected to pass a positive current from said summing junction to the output of said second operational amplifier and a second diode connected to pass a positive current from said second operational amplifier output to said integrator;
    a third input resistor for connecting said tachometer to said second summing junction; and
    a feedback resistor connected between said second diode and said second summing junction.

* * * * *